United States Patent [19]

Chiotis et al.

[11] Patent Number: 5,520,974

[45] Date of Patent: May 28, 1996

[54] ARTICLE FOR SPLICING ELECTRICAL WIRES

[75] Inventors: Achilles Chiotis, Mountain View; Rajendra S. Cornelius, Los Altos; Pravin L. Soni, Union City, all of Calif.

[73] Assignee: Raychem Corporation, Menlo Park, Calif.

[21] Appl. No.: 408,433

[22] Filed: Mar. 22, 1995

Related U.S. Application Data

[60] Division of Ser. No. 157,018, Dec. 1, 1993, Pat. No. 5,441,560, which is a continuation-in-part of Ser. No. 710,489, Jun. 5, 1991, abandoned.

[51] Int. Cl.[6] ..................................................... F16L 11/00
[52] U.S. Cl. .................. 428/35.7; 428/36.9; 174/76; 174/93; 174/77 R; 174/91; 174/92
[58] Field of Search .................. 428/34.9, 36.91, 428/447, 35.7, 36.9; 174/93, 77 R, 91, 92, 76

[56] References Cited

U.S. PATENT DOCUMENTS

| 3,108,985 | 10/1963 | Weyer | 260/37 |
|---|---|---|---|
| 3,996,188 | 12/1976 | Laur | 260/37 SB |
| 4,102,852 | 7/1978 | DeLaTorre | 260/37 SB |
| 4,125,551 | 11/1978 | Petersen | 260/448.2 E |
| 4,184,995 | 1/1980 | Noble | 260/37 SB |
| 4,189,545 | 2/1980 | Modic | 521/131 |
| 4,288,360 | 9/1981 | Bobear | 260/37 SB |
| 4,320,044 | 3/1982 | Nakamura | 524/413 |
| 4,401,491 | 8/1983 | Modic | 156/48 |
| 4,578,116 | 3/1986 | Rott et al. | 106/18.12 |
| 4,634,207 | 1/1987 | Debbaut | 339/116 C |
| 4,695,597 | 9/1987 | Seino | 521/154 |
| 4,716,183 | 12/1987 | Gamarra et al. | 522/80 |
| 4,727,127 | 2/1988 | Sezuki | 528/18 |
| 4,766,191 | 8/1988 | Gvozdidc et al. | 528/14 |
| 4,777,063 | 10/1988 | Dubrow et al. | 427/44 |
| 4,852,646 | 8/1989 | Dittmer et al. | 165/185 |
| 4,942,270 | 7/1990 | Gamarra | 174/93 |

FOREIGN PATENT DOCUMENTS

| 3723980A1 | 2/1989 | Germany | C09J 3/14 |
|---|---|---|---|
| WO90/10035 | 9/1990 | WIPO | C08L 83/04 |

*Primary Examiner*—Charles R. Nold
*Attorney, Agent, or Firm*—Herbert G. Burkard; Yuan Chao; Sheri M. Novack

[57] ABSTRACT

Flame retarded organopolysiloxane gels suitable for sealing and protecting electrical contacts include (i) an organopolysiloxane gel having repeat units of the structure

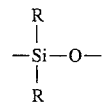

where each R is independently phenyl or $C_1$–$C_4$ alkyl or fluoroalkyl, at least 40% of the R groups being phenyl; and (ii) an additive package mixed with the organopolysiloxane, which is (a) zinc oxide; (b) antimony oxide; (c) a brominated compound having a molecular weight of at least 450 and a bromine content of at least 40 weight %; (d) a chlorinated compound having a molecular weight of at least 300 and a chlorine content of at least 40 weight %; or (e) combinations of the above. The additive package is used in an amount between about 10 and about 60 parts by weight per 100 parts by weight of organopolysiloxane.

11 Claims, 4 Drawing Sheets

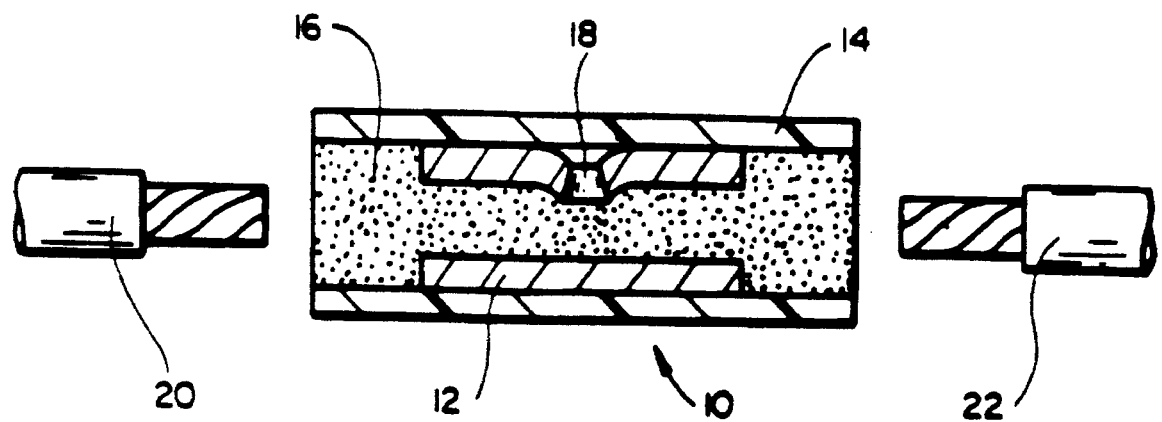
FIG_1
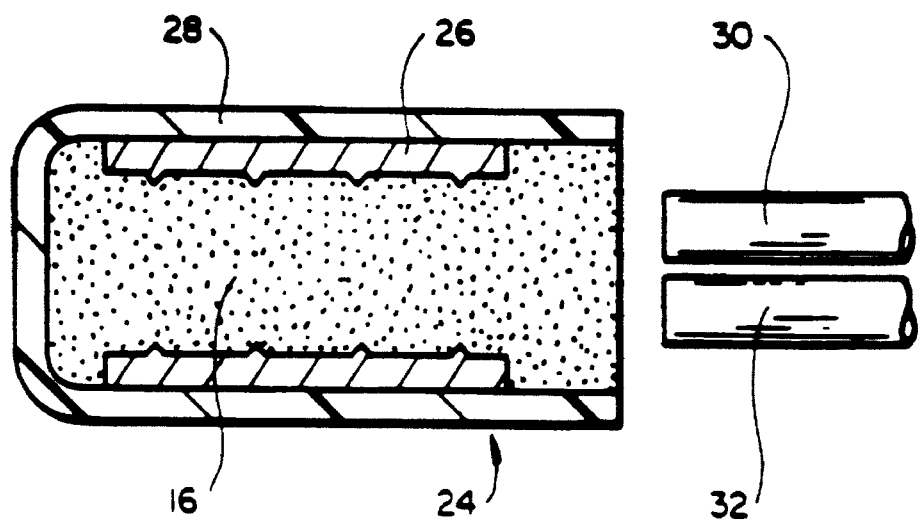
FIG_2

FIG_3
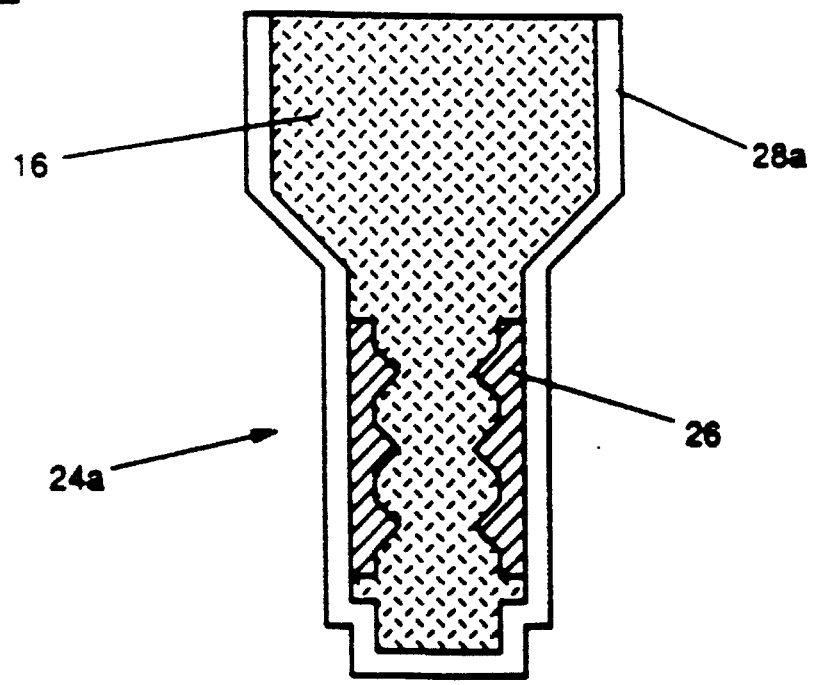
FIG_3a
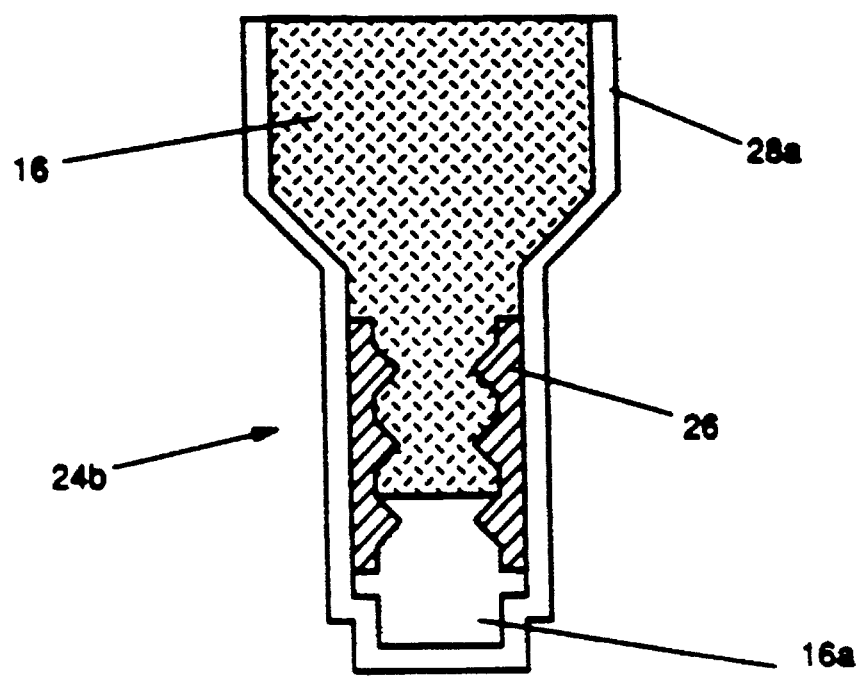

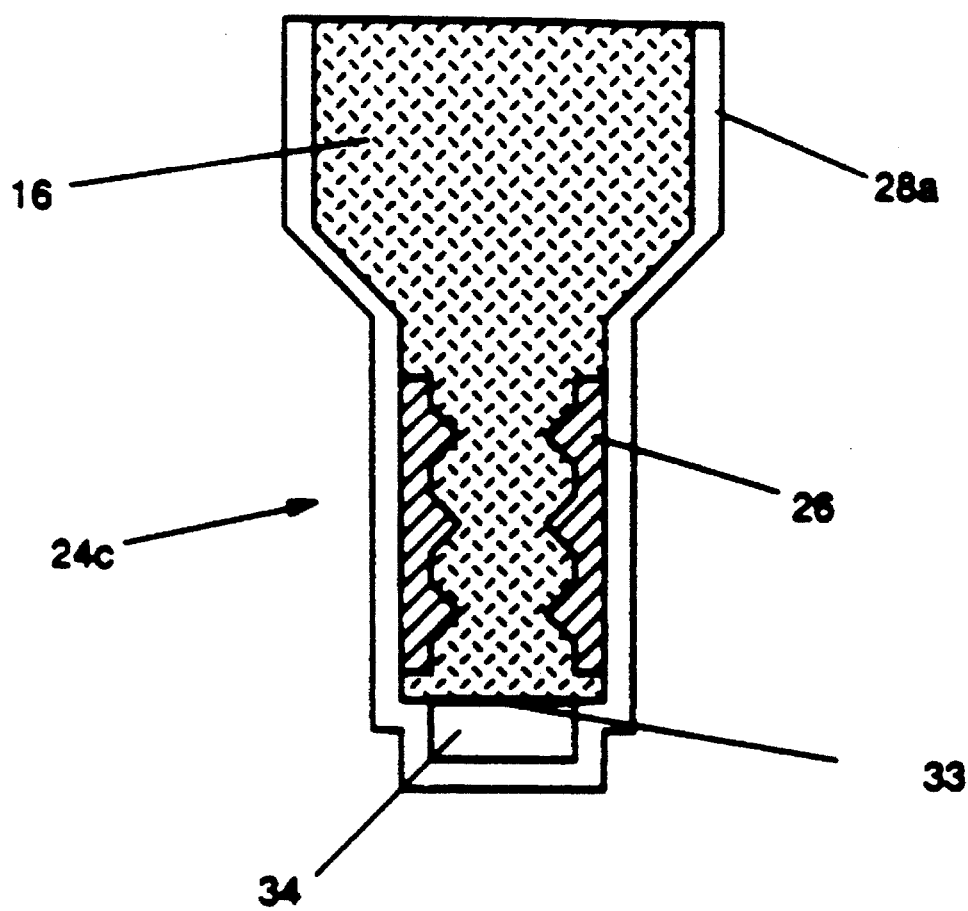

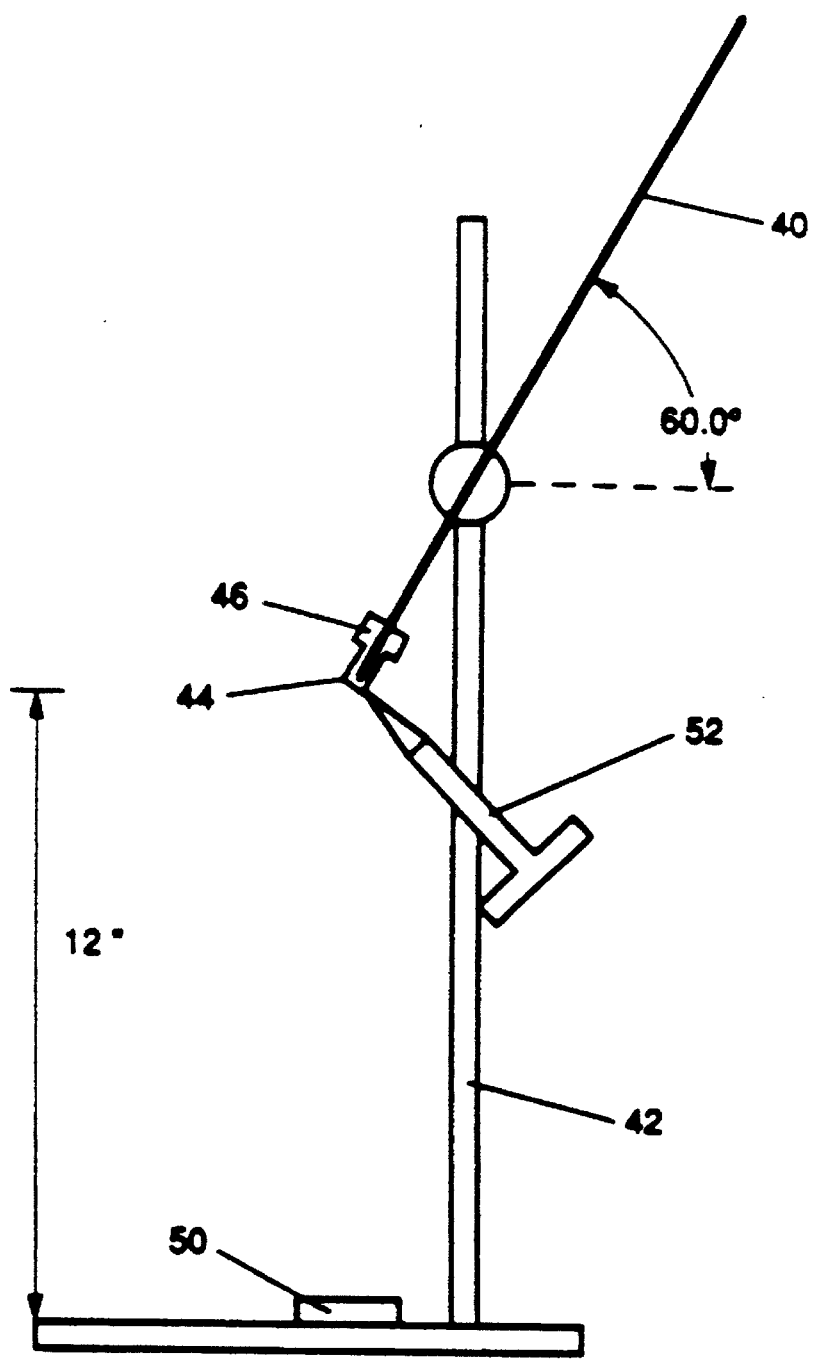
FIG_4

ARTICLE FOR SPLICING ELECTRICAL WIRES

CROSS-REFERENCE TO RELATED APPLICATIONS

This application is a divisional application of U.S. application Ser. No. 08/157,018, Dec. 1, 1993, U.S. Pat. No. 5,441,560, which is a continuation-in-part of U.S. application Ser. No. 07/710,489, filed Jun. 5, 1991, now abandoned, the disclosure of which is incorporated herein by reference.

FIELD OF THE INVENTION

This invention relates to flame retarded gel compositions, methods therefor, and articles comprising the same.

BACKGROUND OF THE INVENTION

A wide variety of substrates require protection from adverse environmental conditions such as moisture, insects, plant life, and corrosion deposits. For some substrates such as electrical components, it is desirable that a protective cove or material be provided such that it is possible to easily reenter and work on the substrate, for the purpose of resplicing, repairing, etc.

It is known to protect an electrical contact with grease, the grease being contained in a container which is applied to the electrical contact. See, for example, Fartar, Jr., U.S. Pat. No. 3,897,129 (1975). However, grease is thixotropic, limiting the ways in which it can be used. Furthermore, when reentry is attempted, the grease remains on the contact when the container is removed and must be cleaned off before electrical work can begin.

Electrical contacts can also be potted or encapsulated in a container with a two-part liquid composition prepared by mixing ingredients which will slowly react together. Before the ingredients have reacted and cured, the mixture is poured into the container, where it cures around the contacts into an encapsulating composition. See, for example, Arnold, U.S. Pat. No. 4,375,521 (1983) and Groves et al., U.S. Pat. No. 4,102,716 (1978). However, this procedure entails preparation of the liquid composition at the work site, waiting while the composition cures, and the provision of a container around the contacts, into which the composition can be poured and allowed to cure. Furthermore, when reentry is required, the cured composition cannot be easily removed.

Another method of protecting substrates employs a gel which has been preformed in the absence of the substrate. The gel and the substrate to be encapsulated are pressed against each other (e.g., with aid of a support member or cover), deforming the gel into close and conforming contact with the substrate. Preferably, at least part of the deformation is elastic deformation. The physical properties of the gel will depend upon the substrate to the protected, the environmental conditions to be protected against, and the method by and apparatus with which the gel and substrate are brought into and maintained in contact. Generally, the gel should be relatively soft and have a relatively high elongation. The term "gel" as used herein denotes a substance having the preceding characteristics, making it suitable for use as described in this paragraph.

Numerous compositions have been proposed for use as gels, including polyolefinic block copolymers, organopolysiloxanes, polyurethanes, and polyureas. See, for example Gamarra et al., U.S. Pat. No. 4,716,183 (1987), Gamarra, U.S. Pat. No. 4,942,270 (1990), Dubrow, U.S. Pat. No. 4,777,063 (1988), Dubrow et al., WO 90/10035 (1990), Debbaut, U.S. Pat. No. 4,634,207 (1987), Rinde et al., WO 91/13109 (1991), and Dittmer et al., U.S. Pat. No. 4,852,646 (1989).

It is often desirable to improve the fire resistance of an organopolysiloxane with additives, where applications requiring superior fare resistance are contemplated. Examples of prior an methods for improving organopolysiloxane fare resistance include Delatorre et al., U.S. Pat. No. 4,102,852 (1978); Seino, U.S. Pat. No. 4,695,597 (1987); Modic, U.S. Pat. No. 4,401,491 (1983); Nakamura, U.S. Pat. No. 4,320,044 (1982); Bobear, U.S. Pat. No. 4,288,360 (1981); Modic, U.S. Pat. No. 4,189,545 (1980); Noble, U.S. Pat. No. 4,184,995 (1980); Laur, U.S. Pat. No. 3,996,188 (1976). Also of interest is RXS Schrumpftechnik, DE 3,723, 980 (1989), which relates to fire retardation in polyolefinic plastic materials.

For certain electrical insulating/sealing applications, for example in aviation wire and cable, a strongly flame resistant gel is required. Conventional additives are generally ineffective for producing an organopolysiloxane gel capable of meeting stringent flammability standards. We have found that by combining certain additive packages with an organopolysiloxane having specified aromatic content, organopolysiloxane compositions suitable for use as gels and capable of meeting stringent flammability standards can be produced. We have further discovered that certain of the additives unexpectedly improve the mechanical properties of the gels without compromising sealing performance.

SUMMARY OF THE INVENTION

This invention provides a flame retarded gel composition comprising:

(i) an organopolysiloxane gel comprising repeat units of the structure

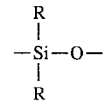

wherein each R is independently phenyl or $C_1$–$C_4$ alkyl or fluoroalkyl, at least 40% of the R groups being phenyl; and (ii) an additive package mixed with the organopolysiloxane, in an amount between about 10 and about 60 parts (preferably 20 to 40 parts) by weight per 100 parts by weight of organopolysiloxane, the additive package being selected from the group consisting of:
  (a) zinc oxide;
  (b) antimony oxide;
  (c) a brominated compound having a molecular weight of at least 450 and a bromine content of at least 40 weight %;
  (d) a chlorinated compound having a molecular weight of at least 300 and a chlorine content of at least 40 weight %; and
  (e) combinations of the above.

In another aspect of this invention there is provided an article for splicing electrical wires comprising:

(A) an electrical connector which is adapted to receive electrical wires and to be mechanically deformed to electrically connect the electrical wires received therein;

(B) an insulating sleeve adapted to surround and receive the connector, and (C) a gel comprising a flame retarded composition as defined hereinabove, disposed and positioned within the electrical connector, so that electrical wires received therein penetrate the encapsulant.

In yet another aspect of this invention there is provided a method for preparing a flame retarded gel composition, comprising the steps of (i) providing a curable organopolysiloxane comprising repeat units of the structure

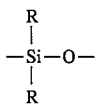

wherein each R is independently phenyl or $C_1$–$C_4$ alkyl or fluoroalkyl, at least 40% of the R groups being phenyl;

(ii) mixing an additive package with the organopolysiloxane or a component thereof, in an amount between about 10 and about 60 parts (preferably 20 to 40 parts) by weight of organopolysiloxane, the additive package being selected from the group consisting of:
(a) zinc oxide;
(b) antimony oxide;
(c) a brominated compound having a molecular weight of at least 450 and a bromine content of at least 40 weight %;
(d) a chlorinated compound having a molecular weight of at least 300 and a chlorine content of at least 40 weight %; and
(e) combinations of the above; and (iii) curing the organopolysiloxane to form a gel.

BRIEF DESCRIPTION OF THE DRAWINGS

FIGS. 1, 2, 3, 3a, and 3b are cross-sectional views of various crimp splicers of this invention, having an organopolysiloxane gel composition according to this invention.

FIG. 4 shows the apparatus for a flammability test used for evaluating the fire resistance of articles having a gel sealant.

DESCRIPTION OF THE PREFERRED EMBODIMENTS

Preferably in the repeat unit

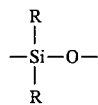

of the organopolysiloxane R is either methyl or phenyl. It has been have found that the introduction of a minimum mount of phenyl groups into the organopolysiloxane is important to obtain the desired flame retardancy effect. It has also been found that organopolysiloxanes having a substantial phenyl content are less affected in their cure chemistry by certain flame retardant packages, such as a combination of antimony oxide and the brominated compound, when compared to an organopolysiloxane devoid of phenyl groups, such as polydimethylsiloxane. Accordingly, at least 40% (preferably at least 45%) of the R groups should be phenyl.

In a preferred embodiment, the organopolysiloxane comprises repeat units of the structure

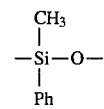

where Ph denotes phenyl. In an organopolysiloxane consisting essentially of such units, about 50% of the R groups in the generic formula —Si($R_2$)—O— would be phenyl.

In yet another preferred embodiment, the organopolysiloxane comprises repeat units of the structure

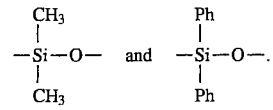

In an organopolysiloxane consisting essentially of these two repeat units in substantially equimolar amounts, about 50% of the R groups in the generic formula —Si($R_2$)—O— would be phenyl.

Additionally, the organopolysiloxane may contain crosslinking sites, such as hydride or vinyl containing siloxane moieties, as described in more detail hereinbelow.

Typically, organopolysiloxanes arc cured or crosslinked in order to provide them with the requisite mechanical properties. In their uncured state they comprise two parts, a part A and a part B, which are mutually reactive when mixed together. The flame retardant additive package may be added to either part A or part B, or both. The two parts are then mixed with each other and allowed to cure. Alternatively, the additive package may be added to the mixed parts immediately after mixing, before the organopolysiloxane has cured. Those skilled in the art will appreciate that, by altering the stoichiometric balance between the two parts, one can affect the extent of cure and hence the physical properties of the resulting gel. An advantage of the instant invention is that relatively soft gels may be obtained without the use of especially added extenders such as oils, which might later separate out in use or compromise the flame resistance properties of the gel.

Preferably, the cure chemistry is based on the reaction between vinyl groups and silicon-bonded hydrogens as the cure sites, in the presence of a platinum catalyst. Vinyl groups may be introduced via vinyl-containing backbone units, such as methylvinylsiloxane (—$CH_3$($CH_2$=CH)Si—O—), or via vinyl-containing terminal units such as vinyldimethyl- or divinylmethylsiloxane (($CH_3$)$_2$($CH_2$=CH)Si—O— or ($CH_3$)($CH_2$=CH)$_2$Si—O—). Silicon-bonded hydrogens may be introduced via backbone units such as hydrogenmethylsiloxane (—$CH_3$(H)Si—O—) or via terminal Si—H containing units such as hydrogendimethyl- or dihydrogenmethylsiloxane (($CH_3$)$_2$(H)Si—O— or ($CH_3$)(H)$_2$Si—O—). In order to attain a true cure, as opposed to merely chain extension, at least some of the organopolysiloxane molecules should have three or more cure sites, i.e., be at least trifunctional.

The platinum catalyst may be any one of the many forms conventional in the art, including platinum deposited on a carrier such as silica gel, alumina, or charcoal; platinic chloride and other platinum salts; chloroplatinic acid and its complexes; and platinum-olefin complexes. Chloroplatinic acid, either as the hexahydrate or in its anhydrous form, is preferred, on account of its facile dispersability in organopolysiloxane systems and the absence of discoloring side-effects. Another preferred catalyst is a complex formed from chloroplatinic acid and siloxane compounds such as divinyltetramethyldisiloxane or cyclovinylmethylsiloxane. Platinum catalysts and organopolysiloxanes are available from commercial suppliers such as Petrarch Systems, General Electric, Dow Corning, or McGhan Nusil.

The preparation and curing of organopolysiloxanes having vinyl and silicon-bonded hydrogen groups is further described, for example, in Smith, U.S. Pat. No. 3,923,705 (1975); Modic, U.S. Pat. No. 4,401,491 (1983); Bobear, U.S. Pat. No. 4,288,360 (1981); Modic, U.S. Pat. No. 4,189,545 (1980); and Dubrow et al., WO 90/10035 (1990).

The compositions of this invention may also be cured by radiation, as taught in Dubrow et al., U.S. Pat. No. 4,777,063 (1988). Another alternative cure chemistry is the well known moisture-promoted cure of siloxanes having silanol groups.

The compositions of this invention preferably have a Voland hardness of between about 1.5 and about 40.0 grams (more preferably between about 2.0 and about 20.0 grams), and an elongation of at least 100% (more preferably at least 200%).

The hardness was measured using a Voland-Stevens Texture Analyzer Model LFRA-1000 with a 5 g trigger on a ¼ in (0.635 cm) ball probe. The probe is advanced down into the gel to a depth of 4 mm at a rate of 0.2 mm per second. The hardness value of the composition is the force in grams required to force the probe at that speed to penetrate or deform the surface of the gel the specified 4.0 mm. This value is referred to as the "Voland hardness".

The elongation is measured using an Instron 1122 tensile tester. Mixed but uncured organopolysiloxane is poured into a polytetrafluoroethylene mold having 10 cavities, each 50.80×10.16×5.08 mm (length×width×depth). The organopolysiloxane is permitted to cure (with heating if desired). The cured organopolysiloxane gel is carefully removed from the respective mold cavity by cutting along the edges of the cavity and sliding it out while handling with release paper. After measuring the sample dimensions and marking a one-inch bench mark with a felt-tip marker, the gel is mounted on the jaws of the Instron tester, with a piece of release paper attached to either side of the end of the gel, to avoid damaging it. The Instron tester was set to a jaw separation of one inch and a jaw pressure of 20 psi. The gel is pulled at 4 in/min, and the elongation at break is noted. For a representative organopolysiloxane gel of this invention, measurement of ten specimens gave an average elongation of 230±50%, the error margin denoting one standard deviation.

In some applications, it is important that the gel be used in a manner permitting convenient reenterability for working on the underlying electrical contact or other substrate. Then, the gel preferably has an adhesive strength to the substrate which is less than the gel's adhesive strength to the support member (or container) holding the gel in place and also less than the cohesive strength of the gel, permitting the gel to be cleanly removed from the substrate by merely separating the support member and the substrate while leaving little or no gel on the substrate. When the encapsulation of the substrate involves pushing at least part of the substrate through the gel so that the gel is parted and then flows back to form a seal on the other side of the substrate, the seal is a plane of weakness which in many cases will separate cleanly when the gel is removed.

The brominated compound should have a high molecular weight, to minimize volatility, and a high bromine content, to maximize its flame retardancy effect. Accordingly, the brominated compound should have a molecular weight of at least 450, preferably at least 900, and a bromine content of at least 40 weight %, preferably at least 65 weight %. Preferred brominated compounds are decabromodiphenyl ether ("DBDPE", $C_{12}Br_{10}O$, MW 935, 86 wt % Br)

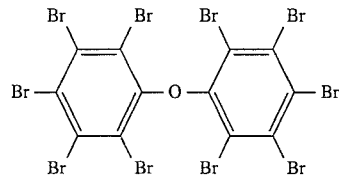

and the bis-imide of 1,2-diaminoethane and tetrabromophthalic anhydride ("DAE/TBPA", $C_{18}H_4Br_8N_2O_4$, MW 951, 67 wt % Br)

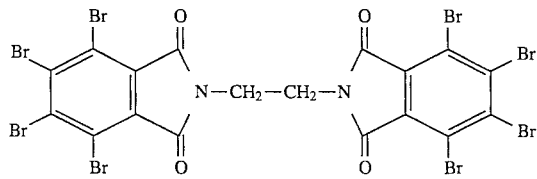

Similarly, the chlorinated compound should have a high molecular weight and a high chlorine content Accordingly, the chlorinated compound should have a molecular weight of at least 300, preferably at least 500, and a chlorine content of at least 40 weight %, preferably at least 65 weight %. A preferred chlorinated compound is the 2:1 adduct of hexachlorocyclopentadiene and 1,5-cyclooctadiene, known commonly as COD-diHEX or Dechlorane Plus™ ($C_{18}H_{12}Cl_{12}$, MW 653.5, 65 wt % Cl).

Other suitable brominated and chlorinated compounds include chlorinated hydrocarbon waxes; 1,2-bis(pentabromophenoxy)ethane; partially brominated styrene oligomers; derivatives of tetrabromophthalic anhydride such as its esters, aluminum salts, and its bisimide having a methylene bridge; octa- and penta-bromodiphenyl ether, perbrominated 1,4-diphenoxybenzene; tetrabromo bisphenol A and derivatives thereof; pentabromochlorocyclohexane; hexabromocyclododecane; 2,3,4,5,6-pentabromoethylbenzene; and 1,2-bis(2,4,6-tribromophenoxy)ethane.

The various flame retardant additive packages may be used in combination; indeed, in some of the preferred embodiments of this invention the time retardant additive packages are combinations. Especially preferred are the combinations of zinc oxide with DBDPE or DAE/TBPA and the combination antimony trioxide with DBDPE or DAE/TBPA, the weight ratio of oxide (zinc or antimony) to the DBDPE or DAE/TBPA being between 3:1 and 1:3.

Whether used in one of the above combinations or as a single-component additive (e.g., DBDPE alone), the total amount of the additive package should be between 10 and 60 parts, preferably 20 and 40 parts, by weight per 100 parts by weight of organopolysiloxane.

The organopolysiloxane gels of this invention may include additional ingredients such as corrosion inhibitors, antioxidants, UV light stabilizers, fungicides and other biocides, pigments, filers to enhance or decrease thermal or electrical conductivity, and fillers to adjust density or other physical properties. In a preferred embodiment, a composition of this invention consists essentially of the organopolysiloxane gel (including any cure catalyst) and the flame retardant package.

The gels of this invention are useful as sealants for articles designed for protective, sealing, or insulative applications. An exemplary article is shown in FIG. 1, depicting in cross-section an in-line crimp splicer 10. Crimp splicer 10 includes three elements: a connector 12, an insulating sleeve 14, and a gel (or encapsulant) 16. These elements are now discussed in detail, but it is to be understood that the various features disclosed with reference to FIG. 1 are also applicable, mutatis mutandis, to other pressure connectors of this invention.

The connector 12 is preferably cylindrical or barrel shaped and consists of a ductile metal which is a good conductor or capable of being deformed with a crimping device (not shown). Suitable metals include copper, aluminum, tin-plated copper, or brass. The connector 12 is also provided with a centrally located conductor stop 18 formed by perforating one side of the wall of the connector 12 and forcing a portion of the wall into the interior of the connector 12.

The insulating sleeve 14 is generally cylindrically shaped and has a bore formed therein which runs the length of the sleeve. The sleeve 14 is shaped and sized to enable mechanical retention of the connector 12 disposed within the bore of the sleeve 14. Suitable materials for the sleeve 14 include nylon and polyvinylidene fluoride ("PVDF"), since the necessary crimping force can be applied through these materials, in an appropriate manner well known in the art, without damage to the insulating sleeve or loss of retention of connector 12. Gel 16 is an organopolysiloxane gel composition according to this invention.

It is advantageous to dispose the gel 16 within the sleeve 14 so that it substantially fills up the bore which runs the length of sleeve 14. In this manner, the electrical wires 20 and 22 penetrate the gel 16, which then seals behind them. Moreover, gel 16 is voided from the area of electrical contact by the mechanical pressure generated by the crimping device during the crimping step. In this way, consequently, the present invention provides an electrical splice; the gel 16 ensures that the splice protects wires 20 and 22 from a corrosive, moist, or hazardous environment. In an alternative embodiment of the present invention, not shown, the sleeve 14 is provided with flexible end-guards which shield and protect gel 16 from dust and incidental contact with solvents.

The apparatus of the present invention also extends to a "B-Wire" crimp splicer 24 of the type shown in FIG. 2, suitable for making stub splices. Here, a connector 26 which is covered with a cap-shaped insulated layer 28 is adapted to receive insulated electrical wires 30 and 32. The apparatus comprises an insulation displacing member which, when connector 24 is crimped around insulated wires placed within the connector, displaces insulation on the electrical wires and effects electrical connection between them. When wires 30 and 32 are inserted into gel 16 and connector 24, a portion of gel 16 is forced out of the connector. When the connector is deformed inward by application of pressure with the crimping tool, the insulation displacing members displace insulation from wires 30 and 32 and effect electrical contact with the conductors inside and form an electrical connection between the wires 30 and 32. Also, the crimping action to form the electrical connection forces additional gel 16 from the connector to seal behind the wires.

FIG. 3 shows an alternative embodiment of the stub crimp splicer of FIG. 2. Splicer 24a differs from splicer 24 of FIG. 1 primarily in the design of insulated layer 28a, gel 16 and connector 26 being basically the same and permissibly made of the same materials as like numbered elements in FIG. 2. Insulating layer 28a differs in that it is flared at the open end, to permit containment of a larger amount of sealing gel.

Yet another embodiment, a splicer 24b, is shown in FIG. 3a (like numerals referring to like elements). If inspection of the crimp connection is desired, this may be prevented by gel 16, which is generally opaque due to the high content of flame retardant. To permit convenient inspection, the bottom portion of insulated layer 28a is filled with a transparent gel 16a (generally not flame retarded). Naturally, insulated layer 28a should be made of a material, such as PVDF, which is sufficiently transparent to permit inspection, at least in those portions thereof adjacent to gel 16a. The remainder of insulated layer 28a is filled with flame retarded gel 16, to provide the requisite flame resistance properties. Transparent gel 16a may be an organopolysiloxane, polyurethane, polyurea, or oil-extended polyolefin block copolymer gel, such as one of the prior art gels cited hereinabove. Owing to the small amount of gel 16a used and its messed location, it does not compromise severly the flame resistance of splicer 24b.

Still another embodiment is shown in FIG. 3b. Splicer 24c (like numerals referring to like elements) has a web or membrane 33 for keeping gel 16 away from the bottom portion of splicer 24c, creating a gel-free cavity 34. When the wires to be connected (not shown) are properly inserted into the connector, they pierce the web and enter into cavity 34. Owing to the fact that this cavity is void free, inspection of the wires (eg to determine if they have been inserted to the appropriate depth for splicing) is easily accomplished.

In summary, the compositions of this invention are useful as gels in electrical pressure connectors (including pigtail connectors), caps, cable seals, termination blocks, splice cases, wrap-around closures, tapes, coatings, and the like. Illustrative apparatuses which may advantageously employ compositions of this invention are described in detail in Hardy et al., U.S. Pat. No. 4,875,879 (1989); Uken et al., U.S. Pat. No. 4,883,431 (1989); Uken, U.S. Pat. No. 4,647,717 (1987); Uken et al., U.S. Pat. No. 4,662,692 (1987); Shimirak et al., U.S. Pat. No. 4,701,574 (1987); Jervis, U.S. Pat. No. 4,610,738 (1986); Follette, U.S. Pat. No. 4,610,921 (1986); Debbaut, U.S. Pat. No. 4,864,725 (1989); and Debbaut, U.S. Pat. No. 4,634,207 (1987).

The fire resistance of the compositions of this invention can be evaluated by a dripping/burning test commonly used for testing articles to be used in environments where flammability requirements are severe, such as the aviation industry. The apparatus for this test is shown in FIG. 4. A brass rod 40, simulating a wire, is mounted on a stand 42 at a 60° angle. The lower end of brass rod 40 is terminated with a splicer 44, of a construction such as splicer 24a from FIG. 3. Splicer 44 contains a predetermined amount (usually about 0.2 g) of gel 46. A cotton pad 50 (optionally supported on a wire mesh, not shown) is placed directly 12 inches (ca. 30.5 cm) below splicer 44. The flame of Bunsen burner 52 is adjusted to have an inner cone/outer cone ratio of 3:1. The inner cone is applied to splicer 44 for 30 seconds. At the end of this period, the burn time of splicer 44 (including gel 46) after removal of the flame is noted, along with whether the cotton pad has been ignited by material dripping down onto it. For use in an environment where flammability resistance requirements are high, such as inside an airplane, a sample may be deemed to have failed the test if either the burning continues for more than 30 seconds or the cotton catches fire. For less demanding applications, the "pass/fail" criteria may be less stringent.

Splice connectors having gel compositions of this invention not only show an excellent pass rate for the burn/drip test, but also show exceptional environmental sealing properties, being able to pass multiple test cycles in which they are subjected to various temperature, moisture, and pressure conditions, simulating service conditions in an airplane.

In addition to being useful in the aviation industry, the gels of this invention are useful in other applications in which flammability resistance is an important performance criterium, such as in indoor electrical systems, automotive wiring, nuclear power plants, and the like.

Additional advantages of the compositions of this invention are an improved compression set (an important characteristic for sealing applications) and lower cost, because of the inclusion of relatively large amounts of inexpensive fillers.

The practice of this invention can be further understood by reference to the following examples, which are provided by means of illustration and not of limitation.

Organopolysiloxane formulations having various flame retardant packages, including comparative ones not according to this invention were prepared, as listed in Table I.

TABLE I

| | Organopolysiloxane compositions | | | | | |
|---|---|---|---|---|---|---|
| | Organopolysiloxane | | | Additive Package | | Hardness $(g)^a$ |
| Ex. | Type | Part A (g) | Part B (g) | 1st Component (g) | 2nd Component (g) | Cure conditions |
| 1 | GE RTV 6156[c] | 12.0 | 8.0 | $Sb_2O_3$ (1.0) | DBDPE (1.0)[d] | 100° C./1 hr | 4.0 |
| 2 | GE RTV 6156 | 10.4 | 9.6 | $Sb_2O_3$ (2.0) | DBDPE (4.0) | 110° C./1 hr | 4.4 |
| 3 | GE RTV 6156 | 10.4 | 9.6 | $Sb_2O_3$ (2.0) | DBDPE (6.0) | 110° C./1 hr | 7.0 |
| 4 | GE RTV 6156 | 12.0 | 8.0 | ZnO (6.0)[e] | DBDPE (4.0) | 110° C./1 hr | 5.8 |
| 5 | GE RTV 6156 | 12.0 | 8.0 | ZnO (4.0) | DBDPE (4.0) | 110° C./1 hr | 4.8 |
| 6[f] | McGhan Nusil[g] | 10.8 | 9.2 | ZnO (4.0) | None | 110° C./2 hr | 4.8 |
| 7[f] | McGhan Nusil | 10.8 | 9.2 | ZnO (4.0) | DBDPE (4.0) | 110° C./2 hr | 4.8 |
| 7a[f] | McGhan Nusil | 10.8 | 9.2 | ZnO (4.0) | DBDPE (6.0) | 110° C./2 hr | 8.0 |
| 8[f] | McGhan Nusil | 10.8 | 9.2 | DBDPE (4.0) | None | 110° C./2 hr | 4.9 |
| 9 | GE RTV 6156 | 11.2 | 8.8 | ZnO (4.0) | $Sb_2O_3$ (2.0) | 100° C./1 hr | 4.1 |
| 10 | GE RTV 6156 | 11.2 | 8.8 | ZnO (6.0) | $Sb_2O_3$ (2.0) | 100° C./1 hr | |
| 11 | GE RTV 6156 | 12.0 | 8.0 | ZnO (4.0) | DBDPE (4.0) | 100° C./1 hr | 4.8 |
| 12 | GE RTV 6156 | 12.0 | 8.0 | ZnO (6.0) | DBDPE (4.0) | 100° C./1 hr | 5.8 |
| 13 | GE RTV 6156 | 12.0 | 8.0 | ZnO (10.0) | None | 100° C./1 hr | 13.5 |
| 14 | GE RTV 6156 | 12.0 | 8.0 | ZnO (12.0) | None | 100° C./1 hr | 18.3 |
| 15 | GE RTV 6156 | 12.0 | 8.0 | DBDPE (2.0) | None | 100° C./1 hr | 4.1 |
| 16 | GE RTV 6156 | 12.0 | 8.0 | DBDPE (4.0) | None | 100° C./1 hr | 4.3 |
| 17 | GE RTV 6156 | 12.0 | 8.0 | DBDPE (6.0) | None | 100° C./1 hr | 4.7 |
| 18 | GE RTV 6156 | 12.0 | 8.0 | $Sb_2O_3$ (2.0) | None | 100° C./1 hr | 5.7 |
| 19 | GE RTV 6156 | 12.0 | 8.0 | $Sb_2O_3$ (4.0) | None | 100° C./1 hr | 6.0 |
| 20 | GE RTV 6156 | 12.0 | 8.0 | $Sb_2O_3$ (6.0) | None | 100° C./1 hr | 6.2 |
| 21 | GE RTV 6156 | 12.0 | 8.0 | $Sb_2O_3$ (8.0) | None | 100° C./1 hr | 6.2 |
| 22 | GE RTV 6156 | 12.0 | 8.0 | $Sb_2O_3$ (10.0) | None | 100° C./1 hr | 6.4 |
| 23 | GE RTV 6156 | 12.0 | 8.0 | $Sb_2O_3$ (12.0) | None | 100° C./1 hr | 6.6 |
| 24 | GE RTV 6156 | 10.4 | 9.6 | $Sb_2O_3$ (2.0) | DBDPE (6.0) | 110° C./1 hr | 7.0 |
| 25 | GE RTV 6156 | 10.4 | 9.6 | $Sb_2O_3$ (2.0) | DBDPE (4.0) | 110° C./1 hr | 4.4 |
| 26 | GE RTV 6156 | 12.0 | 8.0 | $Sb_2O_3$ (1.0) | DBDPE (1.0) | 100° C./1 hr | 4.0 |
| 27 | GE RTV 6156 | 10.4 | 9.6 | $Sb_2O_3$ (2.0) | DAE/TBPA (6.0)[h] | | 4.7 |
| 28 | GE RTV 6156 | 10.4 | 9.6 | $Sb_2O_3$ (2.0) | DAE/TBPA (4.0) | | 4.8 |
| 29 | GE RTV 6156 | 12.2 | 7.8 | HEX/COD (2.0)[i] | None | 100° C./1 hr | 4.4 |

TABLE I-continued

| | | Organopolysiloxane compositions | | | | |
|---|---|---|---|---|---|---|
| | Organopolysiloxane | | Additive Package | | | Hardness (g)[a] |
| Ex. | Type | Part A (g) | Part B (g) | 1st Component (g) | 2nd Component (g) | Cure conditions | |
| 30 | GE RTV 6156 | 12.2 | 7.8 | HEX/COD (4.0) | None | 100° C./1 hr | 4.6 |
| 31 | GE RTV 6156 | 12.2 | 7.8 | HEX/COD (6.0) | None | 100° C./1 hr | 4.6 |
| 32 | GE RTV 6156 | 12.2 | 7.8 | HEX/COD (8.0) | None | 100° C./1 hr | 5.5 |
| 33 | GE RTV 6156 | 12.2 | 7.8 | HEX/COD (10.0) | None | 100° C./1 hr | 6.2 |

[a]Voland hardness
[b]Average of 10 specimens
[c]Platinum cured organopolysiloxane having 1:1 mole ratio of methyl and phenyl groups
[d]Decabromodiphenyl ether
[e]Kadox 911 ™
[f]Comparative example not according to this invention
[g]Platinum cured organopolydimethylsiloxane
[h]Bis-imide of 1,2-diaminoethane and tetrabromophthalic anhydride
[i]Dechlorane Plus 25 ™ (2:1 adduct of hexachlorocyclopentadiene and 1,5-cyclooctadiene)

These formulations were tested by the burning/dripping test described hereinabove. Each test sample contained approximately 0.2 g of the formulation. The results are provided in Table II. Particularly good results were obtained when zinc or antimony oxide was combined with a brominated aromatic compound. The relatively poor results of comparative examples 6–8 are noted.

TABLE II

| | Flammability tests on organopolysiloxane compositions | | | | | |
|---|---|---|---|---|---|---|
| | Dripping | | | Burning | | |
| Ex.[a] | No. dripping & avg. time to drip (sec) | Remarks | % caught fire | Avg. burn time (sec) | Remarks | % burning over 30 sec |
| 1 | None | | 0 | 1.25 | Black smoke[b] | 0 |
| 2 | None | | 0 | 0 | V. light black smoke[b] | 0 |
| 3 | None | | 0 | 0 | Black smoke[b] | 0 |
| 4 | None | | 0 | 10.95 | Black smoke[b] | 0 |
| 5 | None | | 0 | 7.5 | Black smoke[b] | 0 |
| 6 | None | | 0 | 19.25 | Black smoke | 35[c] |
| 7 | None | | 0 | 4.1 | Black smoke | 0 |
| 7a | None | | 0 | 9.85 | Black smoke[b] | 15 |
| 8 | 5 (31) | 3 did not burn; 2 did | 10 | 6.8 | Black smoke | 10[d] |
| 9[e] | None | | 0 | 7.7 | Black smoke[b] | 0 |
| 10[e] | None | | 0 | 25.4 | Black smoke[b] | 60 |
| 11 | None | | 0 | 7.5 | Black smoke[b] | 0 |
| 12 | None | | 0 | 10.95 | Black smoke[b] | 0 |
| 13[e] | None | | 0 | 11.4 | Black smoke[b] | 0 |
| 14[e] | None | | 0 | 10.2 | Black smoke[b] | 10 |
| 15[e] | 1 (24) | | 0 | 22.4 | Black smoke[b] | 20 |
| 16[e] | 3 (24) | | 0 | 4 | Black smoke[b] | 0 |
| 17[e] | 4 (28) | | 0 | 8.7 | Black smoke[b] | 0 |
| 18[e] | None | | 0 | 5.1 | Black smoke[b] | 10 |
| 19[e] | None | | 0 | 0 | Black smoke[b] | 0 |
| 20[e] | None | | 0 | 0 | Black smoke[b] | 0 |
| 21[e] | None | | 0 | 0 | Black smoke[b] | 0 |
| 22[e] | None | | 0 | 0 | Black smoke[b] | 0 |
| 23[e] | None | | 0 | 0 | Black smoke[b] | 0 |
| 24 | None | | 0 | 0 | Black smoke[b] | 0 |
| 25 | None | | 0 | 0 | V. light black smoke[b] | 0 |
| 26 | None | | 0 | 1.25 | Black smoke[b] | 0 |
| 27 | None | | 0 | 0 | [b] | 0 |
| 28 | None | | 0 | 0 | [b] | 0 |
| 29[e] | 5 (28) | | 0 | 28.5 | Black smoke | 40 |
| 30[e] | None | | 0 | 18.8 | Black smoke | 20 |
| 31 | None | | 0 | 13.1 | Black smoke[b] | 0 |
| 32 | None | | 0 | 6.5 | Black smoke[b] | 0 |

TABLE II-continued

Flammability tests on organopolysiloxane compositions

| Ex.[a] | Dripping | | | Burning | | |
|---|---|---|---|---|---|---|
| | No. dripping & avg. time to drip (sec) | Remarks | % caught fire | Avg. burn time (sec) | Remarks | % burning over 30 sec |
| 33 | None | | 0 | 11.2 | Black smoke[b] | 0 |

[a]Results based on twenty samples unless noted otherwise
[b]Samples did not burn fully
[c]Seven samples with burn times between 31 and 38 sec.
[d]One sample burned completely; the others did not
[e]Results based on ten samples We have further discovered that certain of the additives in this invention can be used to control the properties of the gel compositions, in particular their Voland hardness values, without deleteriously affecting other important properties. In principle the Voland hardness of a gel composition can be controlled by varying the ratio of the parts A and B. However, in practice, such hardness control is achieved at the expense of other properties. We have found that zinc oxide not only unexpectedly increases the Voland hardness of a gel composition but also preserves or even improves the toughness, tack, and stress relaxation properties which normally would have been expected to be adversely affected. Illustrative comparative results are provided in Table III.

TABLE III

Mechanical Properties of Gel Compositions Containing Zinc Oxide

| Property | Control[a] | 30 Wt. % ZnO added[a] |
|---|---|---|
| Voland hardness ($V_h$) | 22 (1.0) | 35 (1.0) |
| Elongation (%) | 320 (0.88) | 170 (0.90)[b] |
| | 340 (1.0) | 100 (1.00)[b] |
| Elastic modulus ($10^3$ dyne/cm$^2$) 0°C. | 15 (1.03) | 16 (1.42) |
| 20° C. | 14 (1.03) | 15 (1.42) |
| 50° C. | 14 (1.03) | 16 (1.42) |
| Tensile strength (psi) | 0.43 (1.03) | 1.20 (0.94)[b] |
| | 0.39 (1.25) | 1.20 (1.00)[b] |
| Tensile modulus (psi) | 0.41 (1.03) | 0.90 (0.90)[b] |
| | 0.19 (1.25) | 1.30 (1.00)[b] |
| Toughness (in-lb/in$^3$) | 40 (1.03) | 100 (0.90)[b] |
| | 43 (1.25) | 60 (1.00)[b] |
| Viscous modulus ($10^3$ dyn/cm$^2$) 0° C. | 2.5 (1.03) | 8.0 (1.42) |
| 20° C. | 2.0 (1.03) | 6.0 (1.42) |
| Tack (g) | 20 (1.25) | 34 (1.25) |
| | 18 (1.35) | 31 (1.40) |
| Stress relaxation (g) | 3 (1.25) | 28 (1.25) |
| | 5 (1.35) | 35 (1.45) |

[a]GE RTV 6156 with ratio of part A to part B as noted parenthetically.
[b]20 wt % ZnO.

Further, in a test in which the ability of slabs of the gel composition to protect copper-glass mirrors against corrosion of the copper upon immersion in 60° C. synthetic seawater for 24 hr, the zinc oxide filled gel compositions were superior.

Antimony oxide ($Sb_2O_3$) produced unexpected properties of a different nature. Unlike other particulate fillers, $Sb_2O_3$ caused a decrease in the Voland hardness of the gel composition. It also exhibited the unexpected improvements in viscous modulus, toughness, stress relaxation, and salt water corrosion protection, among other properties. Illustrative comparative results are provided in Table IV.

TABLE IV

Mechanical Properties of Gel Compositions Containing $Sb_2O_3$

| Property | Control[a] | 30 Wt. % $Sb_2O_3$ added[a] |
|---|---|---|
| Voland hardness ($V_h$) | 22 (1.0) | 16 (1.0) |
| | | 12.2 (1.0)[b] |
| Elongation (%) | 150 (1.03) | 360 (1.11) |
| | 210 (1.25) | 360 (1.25) |
| Elastic modulus ($10^3$ dyne/cm$^2$) 0°C. | 15 (1.03) | 14 (0.94) |
| 20° C. | 14 (1.03) | 13 (0.94) |
| 50° C. | 14 (1.03) | 13 (0.94) |
| Tensile strength (psi) | 0.43 (1.03) | 1.20 (1.11) |
| | 0.39 (1.25) | 1.28 (1.25) |
| Tensile modulus (psi) | 0.41 (1.03) | 0.61 (1.11) |
| | 0.19 (1.25) | 1.39 (1.25) |
| Toughness (in-lb/in$^3$) | 40 (1.03) | 220 (1.11) |
| | 43 (1.25) | 230 (1.25) |
| Viscous modulus ($10^3$ dyn/cm$^2$) 0° C. | 2.5 (1.03) | 6.0 (0.94) |
| 20° C. | 2.0 (1.03) | 4.0 (0.94) |
| Tack (g) | 20 (1.25) | 24 (0.94) |
| | 18 (1.35) | 16 (1.25) |
| Stress relaxation (g) | 3 (1.25) | 14 (0.94) |
| | 5 (1.35) | 20 (1.25) |

[a]GE RTV 6156 with ratio of part A to part B as noted parenthetically.
[b]20 wt % $Sb_2O_3$.

Claim dependencies herein have been drafted to comply with PCr Rule 6.4, but it will be understood that any appropriate combination of the features disclosed and/or claimed herein is in itself an embodiment of this invention. Applicant reserves the right to use multiple dependent claims drifted in a different manner in the national stages where permitted.

What is claimed is:

1. An article for splicing electrical wires, comprising:

(A) an electrical connector which is adapted to receive electrical wires and to be mechanically deformed to electrically connect the electrical wires received therein;

(B) an insulating sleeve adapted to surround and receive the connector; and (C) an encapsulant gel disposed and positioned within the electrical connector, so that electrical wires received therein penetrate the encapsulant gel, the encapsulant gel comprising (i) an organopolysiloxane gel comprising repeat units of the structure

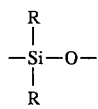

wherein each R group is independently phenyl or $C_1$–$C_4$ alkyl or fluoroalkyl, at least 40% of the R groups being phenyl; and (ii) an additive package mixed with the organopolysiloxane, in an amount between about 10 and about 60 parts by weight per 100 parts by weight of organopolysiloxane, the additive package being selected from the group consisting of:

(a) zinc oxide or antimony oxide or combinations thereof; and (b) a brominated compound having a molecular weight of at least 450 and a bromine content of at least 40 weight %.

2. An article according to claim 1, wherein the encapsulant has a Voland hardness of between about 2.0 and about 20.0 grams and an elongation of at least 100%.

3. An article according to claim 1, wherein the electrical connector is surrounded and retained by the sleeve, and is adapted to be mechanically crimped through the sleeve.

4. An article according to claim 1, wherein the electrical connector is adapted to receive insulated electrical wires and comprises an insulation-displacing member which, when the connector is crimped around insulated electrical wires placed within the connector, displaces insulation on the electrical wires and effects electrical connection between the wires.

5. An article according to claim 1, wherein the connector is adapted to receive electrical wires having end sections which are free of insulation and which, when the connector is crimped around such wires placed within the connector, mechanically deforms the wires so that they are in physical and electrical contact with the connector.

6. An article according to claim 1, wherein the organopolysiloxane comprises repeat units of the structure

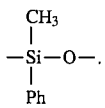

7. An article according to claim 1, wherein the organopolysiloxane comprises approximately equal amounts of repeat units of the structures

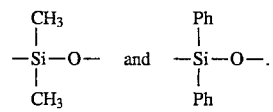

8. An article according to claim 1, wherein the additive package is a combination of zinc oxide and a brominated compound selected from the group consisting of

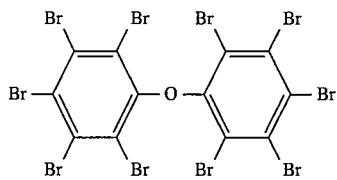

and

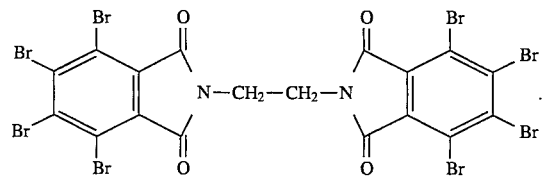

9. An article according to claim 1, wherein the additive package is a combination of antimony trioxide and a brominated compound selected from the group consisting of

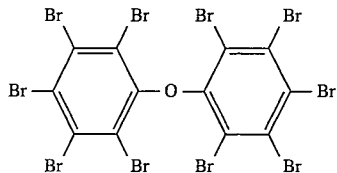

and

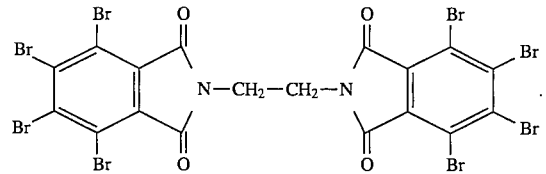

10. An article according to claim 1, further comprising a transparent gel composition disposed and positioned within a portion of the electrical connector and wherein the insulating sleeve is made of a transparent material.

11. An article according to claim 1, further comprising a gel free cavity therein, into which the ends of the wires to be spliced penetrate when said wires are inserted to the proper depth for splicing.

* * * * *

UNITED STATES PATENT AND TRADEMARK OFFICE

CERTIFICATE OF CORRECTION

PATENT NO. : 5,520,974

INVENTOR(S) : Chiotis et al.

DATED : May 28, 1996

It is certified that error appears in the above-identified patent and that said Letters Patent is hereby corrected as shown below:

Column 1, line 23, replace "cove" by --cover--.
Column 1, line 28, replace "Fartar" by --Farrar--.
Column 2, line 7, replace "fare" by --fire--.
Column 6, line 24, replace "content" by --content.--.
Column 6, line 44, replace "time" by --flame--.
Column 6, line 58, replace "filers" by --fillers--.
Column 8, line 14, replace "messed" by --recessed--.
Column 10, Examples 1 through 17 of Table I, in column Cure conditions, replace each occurrence of "C./1" by --C/1-- and "C./2" by --C/2--.
Column 12, line 17 of Table II, in column Ex.[a], replace "9c" by --9e--.
Column 12, line 18 of Table II, in column Ex.[a], replace "10c" by --10e--.
Column 12, line 21 of Table II, in column Ex.[a], replace "13c" by --13e--.
Column 12, line 22 of Table II, in column Ex.[a], replace "14c" by --14e--.
Column 12, line 23 of Table II, in column Ex.[a], replace "15c" by --15e--.
Column 12, line 24 of Table II, in column Ex.[a], replace "16c" by --16e--.
Column 12, line 25 of Table II, in column Ex.[a], replace "17c" by --17e--.
Column 12, line 26 of Table II, in column Ex.[a], replace "18c" by --18e--.

UNITED STATES PATENT AND TRADEMARK OFFICE
CERTIFICATE OF CORRECTION

PATENT NO. : 5,520,974

INVENTOR(S) : Chiotis et al.

DATED : May 28, 1996

It is certified that error appears in the above-identified patent and that said Letters Patent is hereby corrected as shown below:

Column 12, line 27 of Table II, in column Ex.$^a$, replace "19c" by --19$^e$--.
Column 12, line 28 of Table II, in column Ex.$^a$, replace "20c" by --20$^e$--.
Column 12, line 29 of Table II, in column Ex.$^a$, replace "21c" by --21$^e$--.
Column 12, line 30 of Table II, in column Ex.$^a$, replace "22c" by --22$^e$--.
Column 12, line 31 of Table II, in column Ex.$^a$, replace "23c" by --23$^e$--.
Column 12, line 38 of Table II, in column Ex.$^a$, replace "29c" by --29$^e$--.
Column 12, line 39 of Table II, in column Ex.$^a$, replace "30c" by --30$^e$--.
Column 13, line 14 replace "$^c$Results" by --$^e$Results--.
Column 13, line 8 of Table III, in column Control$^a$, replace "340 (1.0)" by --340 (1.01)--.
Column 14, line 45, replace "PCr" by --PCT--.
Column 14, line 49, replace "drifted" by --drafted--.

Signed and Sealed this

Twentieth Day of January, 1998

Attest:

BRUCE LEHMAN

Attesting Officer

Commissioner of Patents and Trademarks